Figure 1:
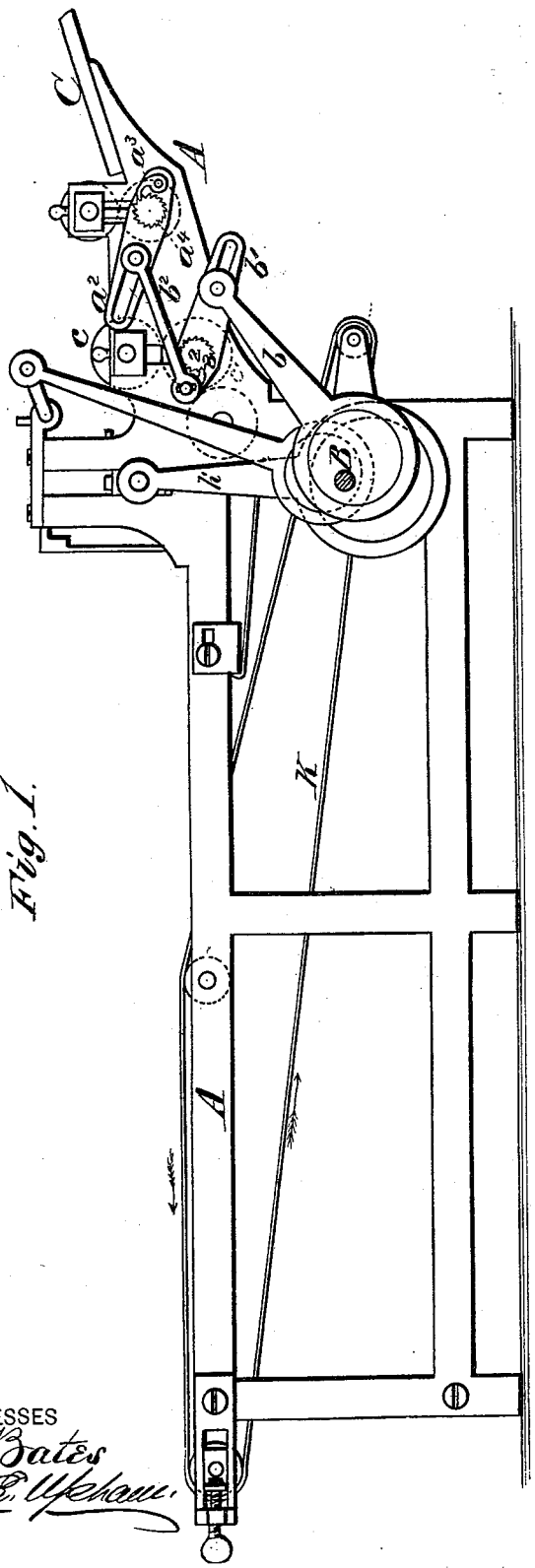

G. W. BAKER.
Cracker-Machine.

No. 165,527.

4 Sheets--Sheet 1.

Patented July 13, 1875.

WITNESSES
E. H. Bates
George E. Upham

INVENTOR
Geo. W. Baker,
Chipman Hosmer & Co,
ATTORNEYS

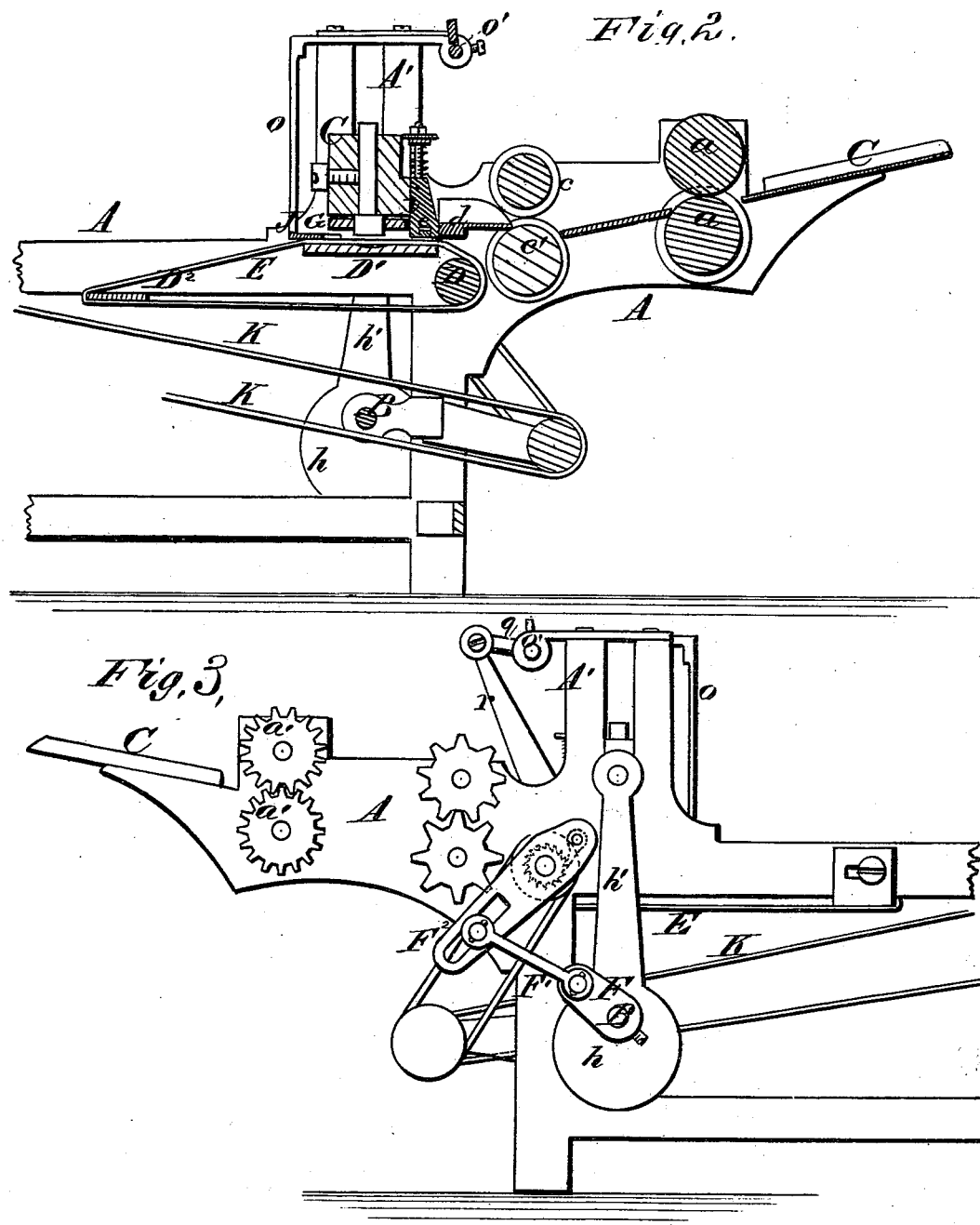

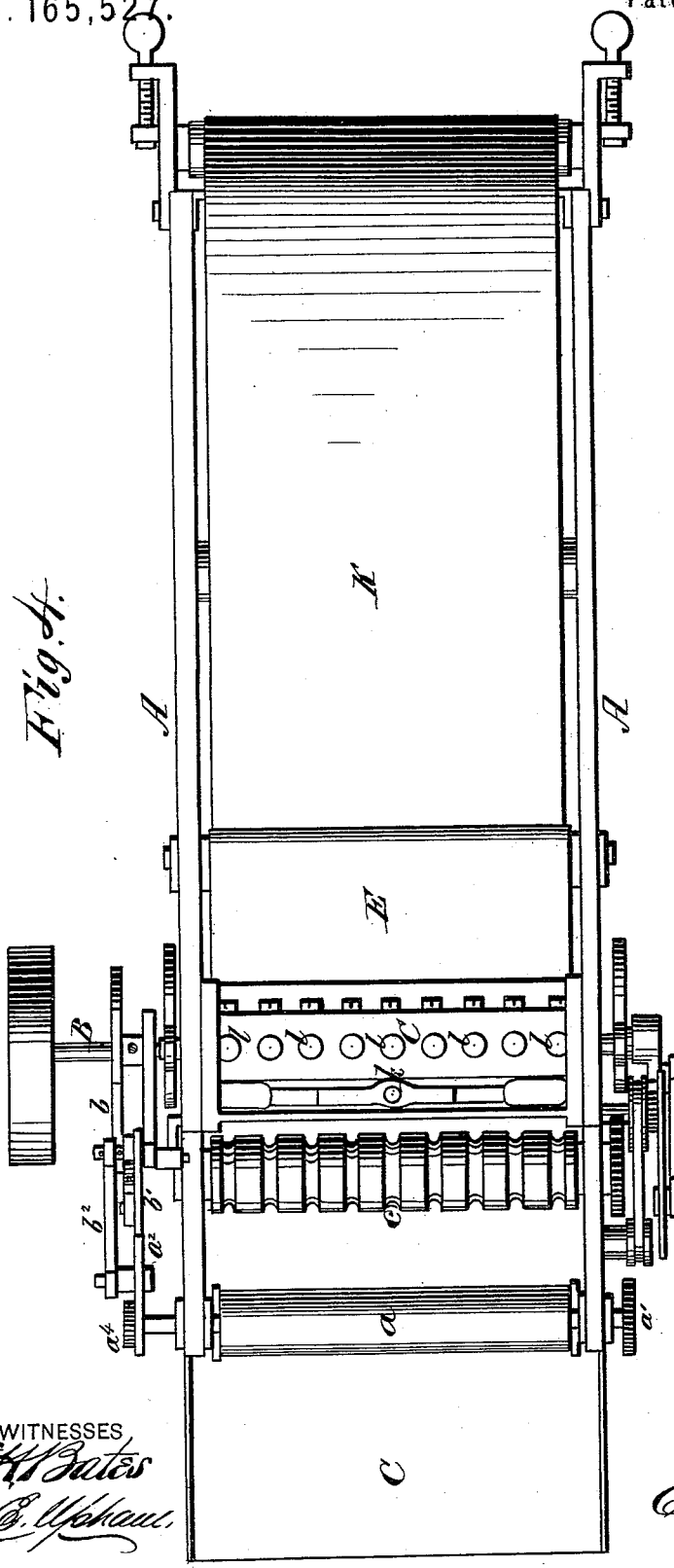

4 Sheets--Sheet 4.
G. W. BAKER.
Cracker-Machine.
No. 165,527. Patented July 13, 1875.
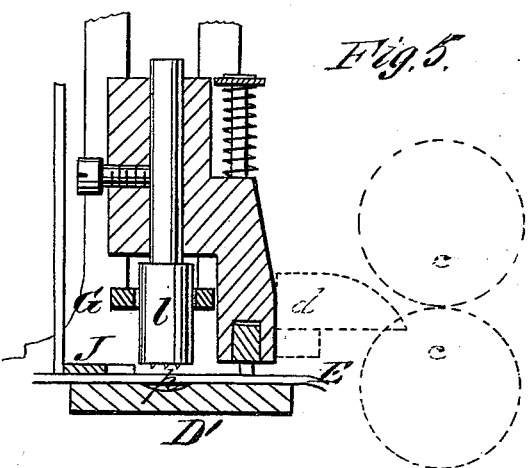
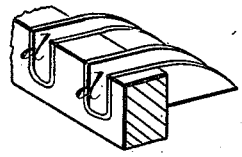
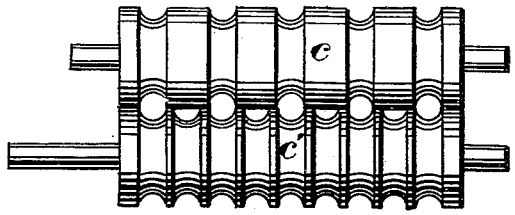
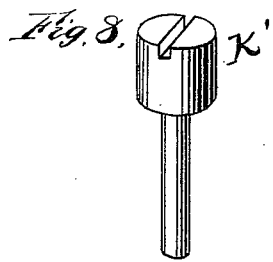
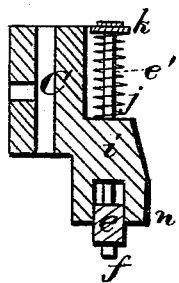
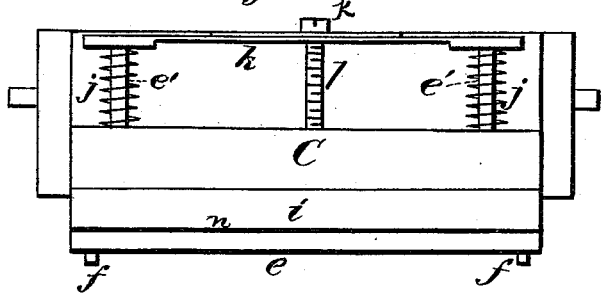
WITNESSES
E. H. Bates
George E. Upham
INVENTOR
Geo. W. Baker
Chipman Hosmer & Co.
ATTORNEYS
N. PETERS, PHOTO-LITHOGRAPHER, WASHINGTON, D.C.

UNITED STATES PATENT OFFICE.

GEORGE W. BAKER, OF WILMINGTON, DELAWARE.

IMPROVEMENT IN CRACKER-MACHINES.

Specification forming part of Letters Patent No. 165,527, dated July 13, 1875; application filed May 15, 1875.

*To all whom it may concern:*

Be it known that I, GEORGE W. BAKER, of Wilmington, in the county of New Castle and State of Delaware, have invented a new and valuable Improvement in Steam-Power Cracker-Machines; and I do hereby declare that the following is a full, clear, and exact description of the construction and operation of the same, reference being had to the annexed drawings making a part of this specification, and to the letters and figures of reference marked thereon.

Figure 1 of the drawings is a representation of a side elevation of my cracker-making machine, and Fig. 2 is a longitudinal vertical sectional view of the same. Fig. 3 is a detail side view, and Fig. 4 a plan view. Figs. 5, 6, 7, 8, 9, and 10 are detail views of my machine.

This invention has relation to steam-power cracker-making machinery; and my invention consists in the combination, with the cutter, of a spring-follower, which presses the pieces of dough into the required round shape, while they lie upon an endless feed-apron which is over a non-yielding table. It also consists in the employment of vertically-reciprocating stamps, in combination with a stationary stripper and a non-yielding table, having depressions in it, whereby the final pressure and shape are given to the crackers, as will be hereinafter explained. The invention, finally, consists in an evener, which receives a vibrating motion, and is operated by an eccentric on the main shaft and a crank on its own shaft, for the purpose of properly adjusting the crackers beneath the stamps, so that when the latter descend they will press centrally upon the cracker.

In the annexed drawings, A designates the frame of the machine and B the main driving-shaft. C designates an inclined feed-board, on which the dough is put to be passed between two rollers, $a\, a$, which feed the sheets and join them, as shown in Figs. 1 and 2. These two rollers are geared together by pinions $a^1\, a^1$ and applied in adjustable journal-boxes. The shaft of the lower roller has a slotted arm, $a^2$, and a ratchet-wheel, $a^4$, applied on it. The arm $a^2$ is loose on its shaft, and carries a pawl, $a^3$, which engages with wheel $a^4$, which latter is fast on its shaft. By these means the rollers $a\, a$ only receive rotation during the backward strokes of the arm $a^2$. The arm $a^2$ receives vibration from the main shaft B, through the medium of arms $b\, b^1$ and a connecting-rod, $b^2$, one of the wrist-pins of which is adjustable in the slot of arm $a^2$ for changing the feed of rollers $a\, a$, as shown in Fig. 1. After the sheet of dough passes the rollers $a\, a$, it is fed between two rollers $c\, c'$, which have annular grooves in them (as shown in Fig. 7) so formed that the sheets are cut or molded into strips or bars having the form of cylinders. The surplus dough which remains in the grooves between the annular ribs of the lower roller affords sufficient elasticity to allow the two rollers to be held very close together. The shaft of the lower roller $c'$ has the slotted arm $b^1$ and a rachet-wheel, 2, on it, and on one end of the arm $b^1$ a pawl, 3, is pivoted, which engages with the ratchet-wheel 2 and gives motion to rollers $c\, c'$, at the same time that the rollers $a\, a$ are moved, as shown in Fig. 1. The wrist-pin which connects the arm $b$ to the arm $b^1$ is adjustable in the slot in the latter for the purpose of adjusting the feed of rollers $c\, c'$. It will be observed that the two pairs of rollers move at the same time, and that they receive their movements from the main driving-shaft.

The round strips of dough which leave the rollers $c\, c'$ are conducted through short channels $d$, as shown in Figs. 2 and 5, and as the strips emerge from these channels they are cut off in suitable lengths to form the crackers, and the pieces cut off are turned over endwise and pressed in the following manner: A' A' designate two slotted standards rising from frame A, and affording guides for the ends of a horizontal head, C, which receives vertical movements from the main shaft B by means of eccentrics $h$ and connecting-rods $h'$, as shown in Figs. 2 and 3. The front lower extension $i'$ of the head C is grooved, and in the groove a follower, $e$, is applied, at the extremities of which studs $f$ are secured for the purpose of preventing the follower from descending too far. This follower has guide-rods $e'\, e'$ secured to it, which rods pass up through the head C and are pressed upon by means of springs $j\, k$, the latter spring being adjustable by means of a set-screw, $k'$, as shown in Figs. 8 and 10. The lip $n$, forming the front portion of the follower-groove, is constructed so as to cut the strips of dough into proper lengths to form the crackers. During the descent of the head C the follower $e$ is brought into play and presses the pieces of dough into vertical position; then the cutter performs its work and leaves the cut pieces of dough in circular form upon an endless apron, E. This apron E passes around a driving-roller, D, over a fixed bed, $D^1$, and around a transverse plate, $D^2$. The roller D receives motion from a crank, F, on shaft B, acting through the medium of connecting-rod $F^1$, vibrating arm $F^2$, and a pawl and ratchet on an extension of the shaft of said roller. The wrist-pin of connecting-rod $F^1$ is adjustable in a slot in the arm $F^2$, as shown in Fig. 3. The apron E moves the crackers beneath a perforated stripper, G, arranged over the fixed bed $D^1$, the holes through which stripper coincide with a number of cylindrical stamps, $l$, which are adjustably secured into the head C, and which should have spurs in their lower ends for perforating the crackers. Directly beneath the perforations through the stripper G concavities $p$ are made in the bed $D^1$ for the purpose of giving roundness to the bottoms of the crackers when the stamps descend upon them, as fully shown in Fig. 5. J designates an evener having a serrated edge, which is secured to the free ends of right-angular arms $o$, which arms are secured to a rock-shaft, $o'$, on one end of which is a crank, $q$, as shown in Figs. 2 and 3. Shaft $o'$ receives oscillation from an eccentric on shaft B by means of a rod, $r$, which is pivoted to the crank $q$. The movement of the evener J is so timed with relation to the movement of the stamps $l$ that just before the stamps complete a descending stroke the evener will be swung beneath the stripper and adjust the crackers in proper position for receiving the stamps centrally upon them.

After the crackers are finished they are delivered from the apron E into pans, which are put upon an endless apron, K. This apron is applied around rollers $t\ t\ t'$, and it receives motion in the direction indicated by the arrow in Fig. 1, from a pulley, $s$, by means of an endless belt, $s'$. The pans are adjusted upon the front end of apron K, and the crackers are delivered into them as they emerge from beneath the apron.

What I claim as new, and desire to secure by Letters Patent, is—

1. The yielding follower $e$, in combination with the cutting device $n$, substantially as described.

2. The combination of splitting-rollers $c\ c'$, guides $d$, cutter $n$, and a yielding follower, $e$, substantially as described.

3. In combination with the cutter $n$, having the yielding follower $e$ and the stamps $l$, the bed $D^1$ and endless apron E, substantially as described.

4. The bed $D^1$, having concavities $p$, in combination with the stamp $l$ and the stripper G, substantially as described.

5. In a cracker-machine, the combination of the feeding and joining rollers $a\ a$, split rollers $c\ c'$, the cutter $n$, the spring follower $e$, the stamp $l$, stripper G, stationary bed $D^1$, and the endless belt, substantially as and for the purpose set forth.

In testimony that I claim the above I have hereunto subscribed my name in the presence of two witnesses.

GEORGE W. BAKER.

Witnesses:
 GEORGE E. UPHAM,
 JNO. B. CORLISS.